Patented Feb. 27, 1923.

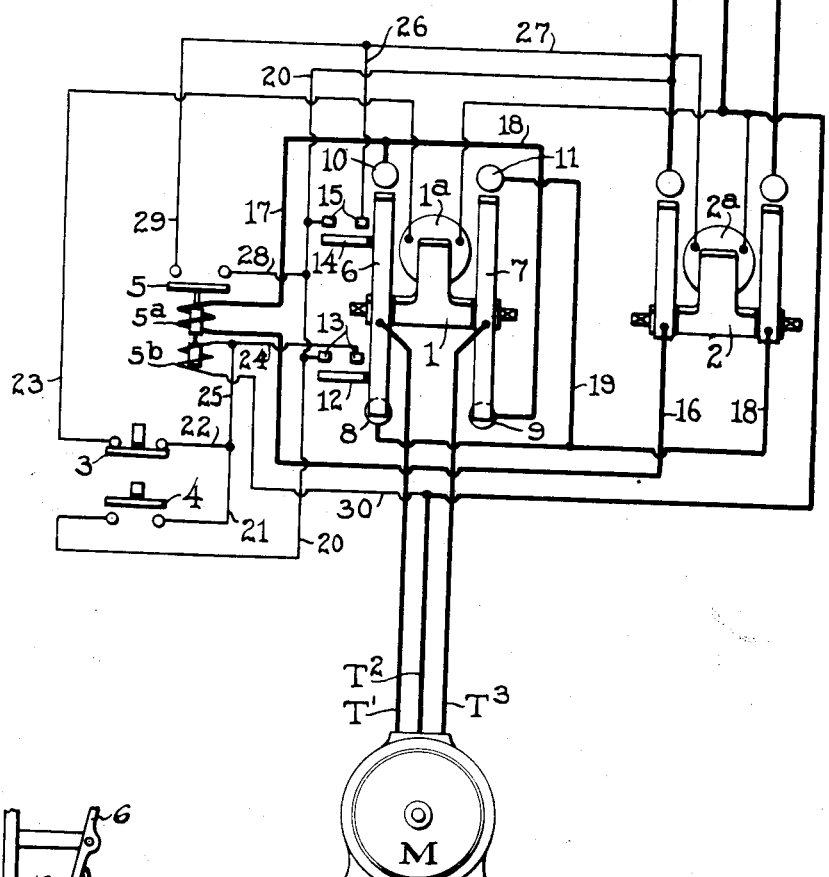

1,446,642

UNITED STATES PATENT OFFICE.

EDWARD I. DEUTSCH, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR CONTROLLER.

Application filed April 2, 1920. Serial No. 370,649.

*To all whom it may concern:*

Be it known that I, EDWARD I. DEUTSCH, a citizen of the United States, residing at Milwaukee, in the county of Milwaukee and State of Wisconsin, have invented new and useful Improvements in Motor Controllers, of which the following is a full, clear, concise, and exact description, reference being had to the accompanying drawing, forming a part of this specification.

This invention relates to motor controllers and more particularly to controllers for alternating current motors.

Controllers for alternating current motors are sometimes designed to brake the motor by reconnecting the same to the supply circuit in a reversed phase relation upon interruption of the running connections. In braking a motor in this manner provision must be made for interrupting the braking connections to prevent speeding up of the motor in a reverse direction.

The present invention has among its objects to provide an improved controller of the aforesaid character adapted to automatically interrupt the braking connections upon stopping of the motor or initial rotation thereof in a reverse direction.

A further object is to provide a simple and reliable controller of the aforesaid character having means responsive to current conditions in the motor circuit for automatically interrupting the braking connections to prevent speeding up of the motor in a reverse direction.

Various other objects and advantages of the invention will hereinafter appear.

The accompanying drawing illustrates an embodiment of the invention and the same will now be described, it being understood that the embodiment illustrated is susceptible of various modifications without departing from the scope of the appended claims.

Figure 1 is a diagrammatic view of a controller embodying the invention; and

Fig. 2 is a side elevational view of a mechanical embodiment of certain of the switch parts shown in Fig. 1.

Referring to the drawing, the same shows a three phase induction motor M of the squirrel cage type to be supplied with current from a three phase alternating current circuit indicated by lines $L^1$, $L^2$ and $L^3$. The controller includes electro-responsive switches 1 and 2 for controlling the motor circuit and control means therefor including push button switches 3 and 4 and a relay 5 functioning as hereinafter set forth.

Switch 1 is of a double pole type, having contact arms 6 and 7 pivoted intermediate their ends and normally engaging contacts 8 and 9 respectively to establish connections for braking and movable away therefrom into engagement with contacts 10 and 11 respectively to interrupt said former connections and establish connections for running, the winding $1^a$ serving to move said arms as just described. Switch 2 is also of a double pole type and is adapted upon energization of its winding $2^a$ to establish circuit from lines $L^1$ and $L^3$ to switch 1.

The push button switches 3 and 4 are respectively normally closed and normally open and are in series with the winding $1^a$ of switch 1. As will be apparent, closure of push button switch 4 serves to energize switch 1 while opening thereof tends to de-energize said switch. Switch 1, however, is provided with an auxiliary contact 12 which bridges contacts 13 upon response of switch 1 to establish a shunt circuit around push button switch 4. This shunt circuit serves to maintain switch 1 energized independently of push button 4 but subject to de-energization by depression of push button switch 3. The latter switch, as will be apparent, is included in both the energizing and maintaining circuits of switch 1. Switch 1 is further provided with an auxiliary contact 14 adapted upon response of said switch to bridge contacts 15 to establish an energizing circuit for switch 2. Return of switch 1 to normal position tends to de-energize switch 2 but as will hereinafter appear relay 5 establishes a shunt circuit around contact 15 for preventing immediate opening of switch 2.

Relay 5 is provided with windings $5^a$ and $5^b$, the former being connected for inclusion in the motor circuit upon establishment of both running and braking connections and the latter being controlled by contacts 12 and 13 of switch 1. Upon closure of switches 1 and 2, windings $5^a$ and $5^b$ act together to effect closure of relay 5.

Switch arms 6 and 7 are provided with resilient contacts on the lower ends thereof, one of said contacts being shown on the lower end of switch arm 6, in Fig. 2.

During return of switch 1 to normal position contact 12 remains in engagement with stationary contacts 13 until the contacts on the lower ends of switch arms 6 and 7 engage contacts 8 and 9 respectively, and due to the resiliency of the contacts on the lower ends of switch arms 6 and 7 contact 12 dis-engages contact 13 upon full return of switch 1 to normal position. Thus de-energization of switch 1 effects momentary de-energization of winding $5^a$ but during this interval winding $5^b$ remains energized by contacts 12 and 13 to hold relay 5 in closed position. However, upon full return of contacts 6 and 7 to normal position winding $5^b$ is de-energized and winding $5^a$ is then energized by the braking current in the motor circuit to hold relay 5 in closed position. As is well known to the current in the motor circuit rises to a maximum value immediately upon establishment of braking connections and decreases as the motor is brought to rest. The current of the motor circuit is still further decreased when the motor begins to rotate in a reverse direction and winding $5^a$ is calibrated to hold relay 5 in closed position until the current in the motor circuit drops to a value corresponding to the stopping of the motor or initial rotation thereof in a reverse direction.

Considering now the motor connections line $L^2$ is permanently connected to the terminal $T^2$ of motor M and assuming that switches 1 and 2 are energized running connections are established from line $L^1$ through the left hand pole of switch 2 by conductor 16 through winding $5^a$ by conductor 17 to contact 10 through contact arm 6 to terminal $T^1$ of motor M and from line $L^3$ through the right hand pole of switch 2 by conductors 18 and 19 to contact 11 through contact arm 7 to terminal $T^3$ of motor M. Assuming now that push button switch 3 has been depressed to de-energize switch 1 the connections just described will be reversed to effect braking of the motor. Line $L^1$ is then connected through the left hand pole of switch 2 by conductor 16 through winding $5^a$ by conductors 17 and 18 to contact 9 through contact arm 7 to terminal $T^3$ of motor M, while line $L^3$ is then connected through the right hand pole of switch 2, by conductor 18 to contact 8 through contact arm 6 to terminal $T^1$ of motor M. As before described, relay 5 controls the energizing circuit of switch 2 and the same will effect interruption of the aforedescribed braking connection either upon stopping of the motor or initial rotation thereof in a reverse direction.

Considering now the control circuits, depression of push button switch 4 completes an energizing circuit for switch 1 extending from line $L^1$ by conductor 20 through switch 4 by conductors 21 and 22 through push button switch 3, by conductor 23 through winding $1^a$ to line $L^2$. Upon response of switch 1 contacts 12 and 13 establish a maintaining circuit for winding $1^a$ extending from line $L^1$ by conductor 20 through contacts 13 by conductors 24, 25 and 22 through push button switch 3 to line $L^2$ as already traced. As is apparent, this maintaining circuit constitutes a shunt around push button switch 4 whereby release of said switch will have no effect on the winding $1^a$. On the other hand, it is apparent that depression of push button 3 will open the circuit of winding $1^a$ and the switch 1 upon opening will open its maintaining circuit to insure against its subsequent energization. With switch 1 closed the energizing circuit of winding $2^a$ extends from line $L^1$ by conductor 20 through contacts 15, by conductors 26 and 27 through winding $2^a$ to line $L^2$. The maintaining circuit for winding $2^a$ extends from line $L^1$ by conductors 20 and 28 through relay 5, by conductors 29 and 27 through winding $2^a$ to line $L^2$. With switch 1 closed the energizing circuit of winding $5^b$ extends from line $L^1$ by conductor 20 through contacts 13 by conductor 24 through winding $5^b$ by conductor 30 to line $L^2$.

While the controller illustrated is of a non-reversing type and is designed for the control of three phase motors, it is to be understood that the same can be incorporated in a reversing controller and that it can also be advantageously used for controlling any type of polyphase current motor. It is therefore to be understood that certain of the appended claims are not limited to the specific application of the controller therein described.

What I claim as new and desire to secure by Letters Patent is:

1. The combination with an alternating current motor of control means therefor for selectively establishing power connections of a given phase relation for running and of a reversed phase relation for braking and means associated with said former means and responsive to current conditions in the motor circuit for interrupting said latter connections when the motor is brought to a condition of rest or substantially so.

2. The combination with an alternating current motor, of control means therefor for selectively establishing power connections of a given phase relation for running and of a reversed phase relation for braking and means associated with said former means necessitating establishment of said former connections prior to establishment of said latter connections and insuring interruption of said latter connections under predetermined current conditions in the circuit of said motor.

3. The combination with an alternating current motor, of a plurality of co-operating control switches therefor operable to selectively establish power connections of a given phase relation for running and of a reversed phase relation for braking, control means for said switches necessitating establishment of said running connections prior to establishment of said braking connections and means associated with said control means for maintaining said braking connections until the current in the motor circuit falls below a predetermined value.

4. The combination with an alternating current motor, of a plurality of electro-responsive control switches therefor, certain for establishing circuits of a given phase relation for running and of a reversed phase relation for braking and another for controlling the continuity of said circuits and means associated with the former of said switches for closing the latter upon establishment of said running circuits and for maintaining the same closed upon establishment of said braking circuits, said means insuring opening of said latter switch when the current in the motor is of a predetermined value.

5. The combination with an alternating current motor, of a plurality of electro-responsive control switches therefor, certain for selectively establishing circuits of a given phase relation for running and of a reversed phase relation for braking and another for controlling the continuity of such circuits, means rendering closure of said latter switch dependent upon establishment of said running circuits and a relay for maintaining said latter switch energized during interruption of said running circuits and establishment of said braking circuits said relay functioning upon establishment of said braking circuits to maintain said latter switch energized until the current in the motor is of a predetermined value.

6. The combination with an alternating current motor, of an electro-responsive control switch therefor biased to a position for establishing circuits of a given phase relation for braking and movable to a position for reversing the phase relation of such circuits for running, an electro-responsive switch for controlling the continuity of the motor circuit and control means for said switches rendering response of said latter switch dependent upon prior response of said former switch, said means insuring closure of said latter switch during interruption of said running circuits and establishment of said braking circuits and further insuring opening of said latter switch upon a predetermined reduction in the braking current in the motor circuit.

7. The combination with an alternating current motor, of a switch operable to selectively establish connections for the motor, of a given phase relation for running and of a reversed phase relation for braking and an electro-responsive switch for controlling the continuity of the motor circuit, said latter switch being adapted to automatically close upon establishment of said running connections and to remain closed upon establishment of said braking connections until the current in the motor circuit falls below a predetermined value.

In witness whereof, I have hereunto subscribed my name.

EDWARD I. DEUTSCH.